United States Patent
Gagel

(12) 
(10) Patent No.: US 10,070,031 B2
(45) Date of Patent: Sep. 4, 2018

(54) METHOD AND DEVICE FOR IDENTIFYING AN OBJECT IN A SEARCH IMAGE

(71) Applicant: DIEHL DEFENCE GMBH & CO. KG, Ueberlingen (DE)

(72) Inventor: Florian Gagel, Uhldingen-Muehlhofen (DE)

(73) Assignee: Diehl Defence GmbH & Co. KG, Ueberlingen (DE)

( * ) Notice: Subject to any disclaimer, the term of this patent is extended or adjusted under 35 U.S.C. 154(b) by 1 day.

(21) Appl. No.: 15/417,296

(22) Filed: Jan. 27, 2017

(65) Prior Publication Data
US 2017/0214833 A1 Jul. 27, 2017

(30) Foreign Application Priority Data
Jan. 27, 2016 (DE) .................. 10 2016 000 873

(51) Int. Cl.
H04N 5/225 (2006.01)
H04N 5/77 (2006.01)
G06T 7/00 (2017.01)
G06T 7/70 (2017.01)

(52) U.S. Cl.
CPC ............ *H04N 5/2259* (2013.01); *G06T 7/70* (2017.01); *G06T 7/97* (2017.01); *H04N 5/2254* (2013.01); *H04N 5/772* (2013.01); *G06T 2207/10004* (2013.01); *G06T 2207/20212* (2013.01)

(58) Field of Classification Search
CPC .... H04N 5/2259; H04N 5/2254; H04N 5/772; G06T 7/97; G06T 7/70
See application file for complete search history.

(56) References Cited

U.S. PATENT DOCUMENTS

| 5,323,987 A | 6/1994 | Pinson | |
| 2007/0009169 A1* | 1/2007 | Bhattacharjya | H04N 5/23254 382/255 |
| 2009/0244300 A1* | 10/2009 | Levin | H04N 5/23248 348/208.5 |
| 2011/0115950 A1* | 5/2011 | Wach | H04N 5/335 348/241 |

(Continued)

FOREIGN PATENT DOCUMENTS

| EP | 2466247 A1 | 6/2012 |
| EP | 2560368 A1 | 2/2013 |
| WO | 03102505 | 12/2003 |

OTHER PUBLICATIONS

Joshi, Neel, et al.; "Image Deblurring Using Inertial Measurement Sensors;" To appear in the ACM SIGGRAPH conference proceedings; pp. 1-8; XP007914259.

*Primary Examiner* — Nhan T Tran
(74) *Attorney, Agent, or Firm* — Laurence A. Greenberg; Werner H. Stemer; Ralph E. Locher

(57) ABSTRACT

A method for identifying an object in a search image, in which the object and surroundings around the object are recorded by an optics unit of a camera. The optics unit is swivelled in the surroundings during the integration of a recorded image and an image processing unit back calculates the search image from the recorded image using the point spread function and the swivelling movement of the optics unit. Then the search image is searched and the object is identified in the search image.

11 Claims, 1 Drawing Sheet

(56) References Cited

U.S. PATENT DOCUMENTS

Figure 1:
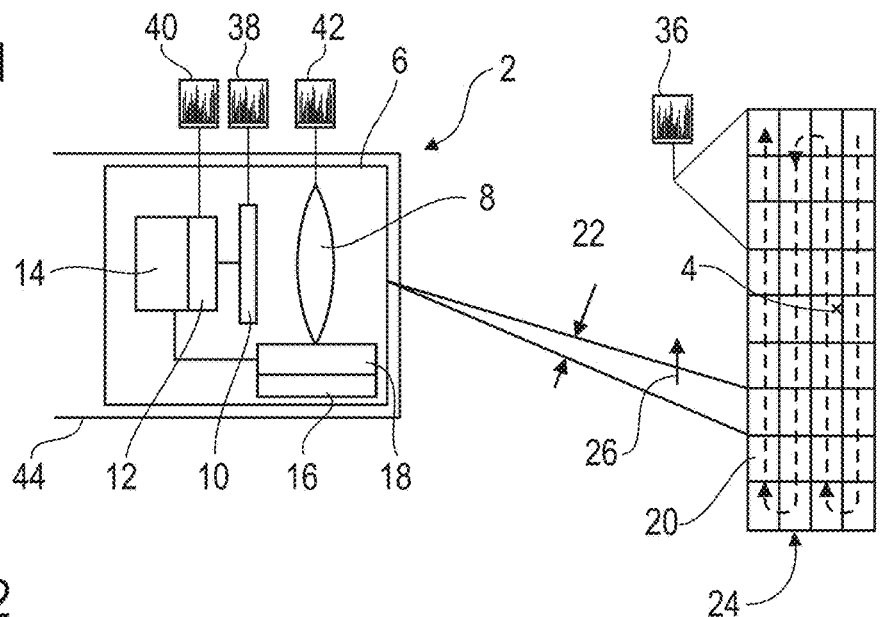

| | | | |
|---|---|---|---|
| 2012/0076362 A1* | 3/2012 | Kane | G06T 5/003 |
| | | | 382/106 |
| 2012/0086822 A1 | 4/2012 | Ishii et al. | |
| 2013/0294645 A1* | 11/2013 | Sibarita | G06T 7/73 |
| | | | 382/103 |
| 2017/0309000 A1* | 10/2017 | Okazaki | G06T 5/003 |

* cited by examiner

METHOD AND DEVICE FOR IDENTIFYING AN OBJECT IN A SEARCH IMAGE

CROSS-REFERENCE TO RELATED APPLICATION

This application claims the priority, under 35 U.S.C. § 119, of German patent application DE 10 2016 000 873.3, filed Jan. 27, 2016; the prior application is herewith incorporated by reference in its entirety.

BACKGROUND OF THE INVENTION

Field of the Invention

The invention relates to a method for identifying an object in a search image, in which the object and surroundings around the object are recorded by an optics unit of a camera.

Infrared cameras which search surroundings for an infrared signature are used to identify vehicles, for example aircraft, from a large distance. So as to be able to identify an object with a small infrared signature in an optically noisy environment it is possible to use high-performance optics units with a large entry aperture. If a compact design of the camera is desired, the field of view of the camera with the same luminous intensity is smaller and a predetermined scan region of the surroundings may be scanned with a number of small images. In the case of a large number of images for a search scan, this method is time-consuming and so searching of a large scan region takes a long time.

SUMMARY OF THE INVENTION

It is accordingly an object of the invention to provide a method of identifying an object within a scan image which overcomes the above-mentioned and other disadvantages of the heretofore-known devices and methods of this general type and to provide an improved method for identifying an object with a weak optical signature in a search image.

With the foregoing and other objects in view there is provided, in accordance with the invention, a method for identifying an object in a search image, the method comprising:
 recording the object and surroundings around the object with an optics unit of a camera to generate a recorded image;
 swivelling the optics unit in the surroundings during an integration of a recorded image; and
 back calculating, with an image processing unit, the search image from the recorded image using a point spread function and a swivelling movement of the optics unit; and
 searching the search image for the object to identify the object in the search image.

In other words, the object is achieved by a method of the type set forth at the outset, in which, according to the invention, the optics unit is swivelled in the surroundings during the integration of a recorded image and an image processing unit back calculates the search image from the recorded image using the point spread function and the swivelling movement of the optics unit and the search image is searched for the object.

The invention proceeds from the idea that the overall recording time of a scan with a plurality of images may be reduced in relation to conventional scanning of the surroundings if the camera optics unit is not at rest during the integration of the recorded image and not only moved in a jerky manner between two recorded images, but if, instead, it is already swivelled in the surroundings during the integration of the recorded image. The time interval between the integration of two images recorded in succession may be reduced and the scanning process may be accelerated. A disadvantage here is that the image signature of the object is blurred in the recorded image by swivelling of the optics unit. However, in the case of a known swivelling movement, this swivelling blur may be calculated back to a stationary image of the object. In this manner, the disadvantage of image blurring arising from the swivelling movement may be largely compensated for and the scanning method may be accelerated.

In order to compensate the image blurring, it is necessary to back calculate the blurred recorded image into the improved search image. The point image blurring caused by the point spread of the optics unit may easily be included in this back calculation. As a result of this, the image of the object is made sharper and may be identified in an improved manner in the search image, even in the case of a weak signature. Combining the point spread function and the swivelling movement of the optics unit may be considered in a single inverse convolution in the back calculation, and so the calculation is very efficient and the result is very advantageous as a result of the combination. As a result of the two-fold back calculation of the point spread function and the swivelling movement, it is also possible to identify objects with a weak image signature in the surroundings in front of a noisy background.

Expediently, a plurality of recorded images are recorded immediately in succession during a continuous, i.e. uninterrupted, swivelling movement of the optics unit; i.e., the optics unit swivels through the surroundings during the integration of each recorded image. The integration occurs during an integration time, i.e. from an integration start to an integration end. The integration time is the integration time of the image cells of the camera or of a detector of the camera for a recorded image and may be considered to be analogous to an exposure time of an image. The integration time may be fixedly set in advance or else be selected depending on a luminosity of the surroundings, analogously to an automatic exposure setting.

Expediently, the camera is an infrared camera and the recorded image is recorded, in particular, in the infrared spectrum only. The method is particularly suitable for searching for a vehicle, in particular an aircraft, in the surroundings, and so the object is a vehicle or an aircraft. The method is likewise advantageously applicable as a method for controlling a missile, wherein the camera may be a component of, in particular, a seeker head of the missile and/or a start-up device of the missile. The search image is, in particular, created prior to a launch of the missile and the object is identified in the search image. The object in the search image or the position thereof in the search image may be marked, and so the object is thus marked as a target of the missile. In particular, the missile can head for the object independently.

In an advantageous embodiment of the invention, the convolution kernel of the point spread function and of the point blurring by the swivelling movement is used for the back calculation, wherein the search image is calculated, in particular, by inverse convolution with the convolution kernel. Here, the convolution kernel may contain an integral of the point spread function over the spatial curve of the swivel. The inverse convolution expediently occurs in the frequency space.

In order to find the object in large-area surroundings, it is advantageous if a search space is completely covered by a sequence of recorded images which are recorded, in particular, during continuous swivelling of the camera. Swivelling may be carried out in an S-direction of a plurality of image rows lying next to one another or over one another. Here, the swivelling need not have a steady swivelling speed but may be accelerated during an image recording, i.e. during the integration of a recorded image.

In order to reduce the probability of an incorrect identification of an object in the search image, it is advantageous if the object, i.e. a point or structure in the search image, is imaged by a plurality of search images. By way of example, if each point of a search space is covered by at least two search images, the presence of an object identified in a first search image may be checked in the second search image. To this end, it is advantageous if the swivelling movement during the image recording, i.e. during the integration of the recorded image, is at most 50% of the image diameter of the search image, in particular of the recorded image, in the swivelling direction, i.e., for example, the field of view (FOV) of the camera in the recorded image. In order nevertheless to be able to search the search space as quickly as possible, it is advantageous if the swivelling movement is at least 10%, in particular at least 30%, of the image diameter in the swivelling direction.

Different back calculation methods are advantageous, depending on whether the point spread function of the optics unit is continuous over the entire image surface or FOV. In the case of a constant point spread function, the back calculation by means of a Wiener filter is particularly advantageous. In the case of the Wiener filter, the spectral density and/or distribution of the noise may be taken into account in a simple manner such that the inverse convolution is more robust against noise. In particular, a back calculation by means of iteration methods is advantageous in the case of a non-continuous point spread function. By way of example, the Landweber iteration or a Richardson-Lucy, van Cittert or Tikhonov-Miller iteration method is possible and expedient. The listed regularization methods have a low error susceptibility of the inverse convolution to noise in the image from the surroundings of the object.

The background noise in the recorded image plays a large role, particularly in the case of very weakly luminous objects, and so finding of the object may be improved as more details about the noise are known. Such an improvement of the identification method may be achieved if noise in the frequency space caused by the optics unit is used as a parameter in the back calculation. The noise of the optics unit may be measured in advance and used as a parameter of the Wiener filter or of an iteration method.

Readout noise caused by the readout electronics of the camera is used as a parameter during the back calculation with the same advantage. The use of detector noise of the camera as a parameter during the back calculation is also possible and advantageous. In the case of an infrared recording, the thermal noise of the detector, in particular, is of importance and expediently used as a parameter during the back calculation. Such a parameter may be used as a parameter of the Wiener filter or of an iteration method.

It may be the case that a search for an object in the surroundings was unsuccessful, for example because the object was still too far away or the background radiation was too strong. If a parameter of the real background noise, for example infrared radiation of the sky also recorded around the object, is now known during a second search, this parameter may be used in the back calculation such that the interference thereof in the subsequent search is reduced. Accordingly, it is proposed that background noise of the surroundings or a parameter therefrom ascertained from an earlier image recording is used as a parameter in the back calculation, for example as a parameter of the Wiener filter or of an iteration method.

When scanning over a relatively large space of surroundings, it is advantageous if the background noise or a parameter thereof is ascertained in a spatially dependent manner, in particular by way of a sequence of recorded images. So as not to suppress measured object-specific radiation in the back calculation in the case of an object which is stationary in relation to the background as a result of taking the background noise into consideration in a spatially dependent manner, it is advantageous if the background noise is ascertained in an averaged manner over at least a portion of a recorded image and taken into account in the back calculation.

The invention is moreover directed to an apparatus for identifying an object in a search image, comprising a camera unit which comprises an optics unit, a detector and a drive for swivelling the optics unit in the surroundings. It is proposed that the apparatus, according to the invention, comprises a swivel capture unit and an image processing unit which is prepared to control image recording during driven swivelling of the optics unit and capture the swivelling by means of the swivel capture unit during the image recording, wherein the image processing unit is prepared to back calculate a search image from the recorded image using the point spread function and the captured swivelling movement of the optics unit and search the search image for the object.

The description of advantageous configurations of the invention provided above contains numerous features, which are reproduced in combination to form additional features in a few dependent claims. However, expediently, these features may also be considered individually and combined to form expedient further combinations, in particular in the case of dependency references of claims, and so an individual feature of a dependent claim is combinable with a single feature, a number of features or all features of another dependent claim. Moreover, these features are combinable, respectively on their own and in any suitable combination, both with the method according to the invention and with the apparatus according to the invention in accordance with the independent claims. Thus, method features should also be considered to be phrased in substantive fashion as properties of the corresponding apparatus unit and functional apparatus features should also be considered to be phrased as corresponding method features.

Other features which are considered as characteristic for the invention are set forth in the appended claims.

Although the invention is illustrated and described herein as embodied in a method for identifying an object in a search image, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

Figure 2:
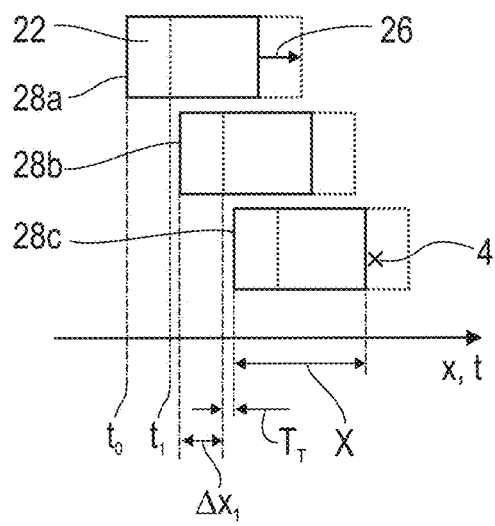
Figure 3:
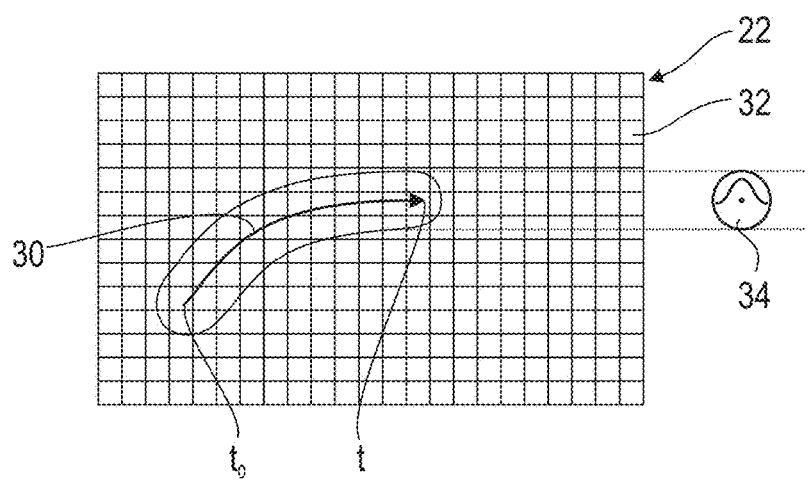

FIG. 1 shows an apparatus for identifying a weakly luminous object, comprising a camera which scans a search space with four rows of recorded images lying next to one another, from which four rows of search images are generated, FIG. 2 shows three recorded images in a space-time sequence diagram and FIG. 3 shows a movement of the field of view of the optics unit of the camera from FIG. 1 while recording a recorded image with a point spread generated thereby in a schematic illustration.

DETAILED DESCRIPTION OF THE INVENTION

Referring now to the figures of the drawing in detail and first, particularly, to FIG. 1 thereof, there is shown an apparatus 2 for identifying an object 4, comprising a camera 6 for recording the object 4. The camera 6 is equipped with an optics unit 8, a detector 10, readout electronics 12 and an image processing unit 14. The camera 6 is an infrared camera, and so the optics unit 8 is an infrared optics unit and the detector 10 is an infrared detector, for example a bolometer. Moreover, the detector 10 is a matrix detector with a multiplicity of detector elements for the image-resolved depiction of the object 4 and the surroundings thereof.

The camera 6 serves to scan a search space 24, for example a half space of surroundings with a 90° elevation extent and a 180° azimuth extent, or a part thereof, by way of a plurality of search images. For the purposes of scanning the surroundings, the camera 6 overall, or only the optics unit 8 thereof, is swivelable, wherein the swivelling in the surroundings may be captured, and so the current direction of view of the camera 6, or of the optics unit 8 thereof, is known. For the purposes of swivelling at least the optics unit 8 in the surroundings, the apparatus 2—or specifically, in the exemplary embodiment shown in FIG. 1, the camera 6—comprises a drive 16 for swivelling, or pivoting, the camera 6 or, in the shown exemplary embodiment, for only swivelling the optics unit 8.

For the purposes of capturing the swivelling movement, a swivel capture unit 18 is present, the latter capturing the current direction of view of the camera 6 or of the optics unit 8, for example proceeding from a known reference direction. For the purposes of assigning search images 20 to directions in the search space 24, the swivel capture unit 18 is signal-connected to the image processing unit 14, and so a recorded image may be positioned in the search space 24 or the position of said image in the search space 24 is known. The search images 20, for example a plurality of rows of search images 20 lying next to one another or over one another, by means of which, overall, the search space 24 is completely covered may be inserted into the search space 24 like an image wallpaper as a result thereof.

In the exemplary embodiment depicted in FIG. 1, the field of view (FOV) 22 indicated schematically in FIG. 1 scans the entire search space 24 image-by-image. To this end, the field of view 22 of the camera 6 is swivelled in the search space 24, as indicated by the dashed S-shaped arrow in FIG. 1. As a result of this, the search space 24 is completely covered by a multiplicity of recorded images covering one another, the search images 20 covering one another subsequently being generated from said recorded images. The current swivelling direction 26, which is that of the direction of the dashed arrow depending on the current position of the field of view 22 in the search space 24, is depicted in FIG. 1 by a small solid-line arrow.

In a schematic illustration, FIG. 2 shows three recorded images 28a, 28b, 28c, from which a search image 20 is generated in each case. Below, the first search image 28a is considered first, the integration of which starts at the time $t_0$. The image recording or the exposure time of the first recorded image 28a starts at the time $t_0$. The field of view 22, i.e. the image portion in the search space 24 which is covered by the first recorded image 28a, is characterized in FIG. 2 by a rectangle with solid lines. During the image integration, the optics unit 8 or the camera 6 is continuously swivelled in the search space 24. At the end time $t_1$ of the integration, the field of view 22 has moved forward by the distance $\Delta x_1$ in the swivelling direction 26. In the shown exemplary embodiment, the field of view 22 of the camera 6 is swivelled continuously and constantly during the recording of the three recorded images 28, and so the integration time $T_I = t_1 - t_0$ corresponds to the swivelling distance $\Delta x_1$. However, it is also possible for the swivelling of the field of view 22 of the camera 6 to be accelerated within the integration time such that time and space are not linear to one another.

Recording the second recorded image 28b starts after a dead time $T_T$, during which the detector elements of the detector 10 are read out and therefore do not detect radiation in an evaluable manner. The recorded image 28b covers more than half of the recorded image 28a. FIG. 2 shows three recorded images 28 below one another merely for the purposes of improving the presentability. However, in reality, they are arranged next to one another in the swivelling direction 26 and cover one another such that the upper edge of all recorded images 28 together forms a straight line. It is possible to see that even the third recorded image 28c still partly covers the first recorded image 28a. Two adjacent recorded images 28 cover one another by more than 50% and less than 90%. In the illustrated exemplary embodiment, the overlap is 55%. The swivelling movement during the integration of a recorded image 28 is 40% of the image diameter in the swivelling direction 26, i.e. of the image length of the recorded image 28 in the swivelling direction 26.

On the basis of the object 4, which migrates into the third recorded image 28c in an exemplary manner during the recording or integration, it becomes clear that each search space point migrates over a plurality of recorded images 28, i.e. it is recorded in a manner blurred in the swivelling direction 26 in each one of the plurality of recorded images 28. In the exemplary embodiment of FIG. 2, each point, just like the object 4, appears in at least three recorded images 28, with the blur path being completely contained in at least one recorded image 28b and being at least partly contained in the adjacent recorded images 28a and 28c.

A search image 20 is calculated from each recorded image 28. The search images 20 also cover one another within the search space 24 in a manner corresponding to the recorded images 28. For the purposes of calculating the search image 20, the blur of a point object in the recorded images 28, caused by the swivelling in the swivelling direction 26 during the image integration, is back calculated in such a way that a point object is displayed as a point in the search image 20. This is explained below on the basis of the illustration from FIG. 3.

The entire image space of a recorded image 28 in the search image 20 is taken into account in the back calculation of a recorded image 28 into a search image 20. The image space of a search image 20 in this respect has the dimensions of the field of view 22, which equals the dimensions of the recorded image, plus the space additionally covered by the swivelling of the field of view 22, which is depicted by the dotted additional space to the right of the field of view 22 in FIG. 2. Even if the object 4 is not yet visible in the field of view 22 of the third recorded image 28 at the time $t_0$, i.e. at the start of the image recording or image integration, the object 4 migrates into the field of view 22, i.e. into the recorded image 28, during the swivelling; in this case, the image of the object 4 migrates into the field of view 22 from the right. It is therefore present or imaged on the right-hand side of the image field of the search image 20.

FIG. 3 shows the swivel vector 30 of the swivelling movement in the swivelling direction 26, which is a curved line in the illustration of FIG. 3, for example like the reversal direction of the dashed arrow from FIG. 1. A field of view 22 with a matrix of image points 32 or pixels of the detector 10 is depicted in a simplified manner. A search image 20, in which the point object is imaged in a punctiform manner, may be generated from the recorded image 28 with the point image blurred in accordance with the swivel vector 30 by way of an inverse convolution of the recorded image 28 and a swivel vector 30.

The search images 20 cover one another more than the smaller recorded images 28 cover one another. The image space of a recorded image 28 corresponds to a portion of the search space 24 which is stationary in the search space 24, which was covered by the field of view 22 within the course of an integration time or recording period. It is larger than the recorded image 28 itself. Therefore, each image point 32 of a search image 20 is at rest in the search space 24 and is covered by a number of pixels of the recorded image 28. Image points 32 and pixels or picture elements of the detector 10 have the same size and are equivalent to one another. The image point 32 of the search image 20 is calculated from the pixels or data of the detector elements which have covered or passed over a static image point, wherein, during the spread as a result of the point spread 34, laterally adjacent detector elements or pixels of the recorded image 28 are also taken into account. From these, the content of the image point 32, in the simplest case the brightness thereof or the greyscale value saturation, is back calculated by inverse convolution, for example by means of the blur kernel.

The camera 6, and in particular the optics unit 8 thereof, generates image aberrations which image a point object in a manner blurred in space in the recorded image 28. Such image aberrations may be reproduced by a point spread function which specifies how a point image is displayed blurred in space in a two-dimensional area in the xy-direction. In this respect, the point spread function (PSF) specifies the point spread 34 with which a point object or point image must be convolved in order to obtain the blurred point object in the recorded image 28, said point object being spread in the recorded image 28 in accordance with the point spread 34 and depicted in a blurred manner. In FIG. 3, the point spread 34 is indicated by a point and a point spread which is stylized by a Gaussian curve. As a result of this, a point object, as reproduced in a schematic manner by the circle, is spread and depicted in a blurred manner.

This point spread 34 may also be calculated back by an inverse convolution, and so optical faults of the camera 6 are in any case eliminated in part and predominantly to a large extent by the back calculation. As a result of this, a point object is imaged with less blurring in the search image 20 than in the recorded image 28. There is two-fold blurring as a result of the swivelling movement of the camera 6, indicated by the swivel vector 30, specifically blurring by the point spread and blurring by the swivelling. Hence, both factors should be taken into account in the back calculation. Therefore, the convolution kernel of the point spread function and of the point blurring by the swivelling movement is used for the back calculation. The search image 20 is calculated by inverse convolution with the convolution kernel. In a simple case, the convolution kernel may be specified as a blur kernel as:

$$K(\vec{x}, \vec{y}) = \frac{1}{t} \int \sigma(\vec{s}(\tau) + \vec{x} - \vec{y}) d\tau$$

K: Blur kernel
T: Time
$\sigma = \sigma(\vec{x})$ Point spread function
x, y: Coordinates of the swivelling at the time $t_0$, i.e. at the start of the swivel vector 30 or at the start of the integration,
s=s(t): Scanning movement in accordance with the swivel vector 30.

If the point spread function is uniform over the entire two-dimensional field of view 22, as is the case here in an exemplary manner as a result of the comparatively small field of view 22 of the camera 6, it is possible to use the Wiener filter for the back calculation. The so-called Wiener deconvolution is an application of the Wiener filter, by means of which image noise in the deconvolution may be taken into account. The image noise in the background of the object 4 plays a great role, particularly when identifying an only weakly luminous object 4. In terms of the signature thereof, the object 4 only stands out a little from the image background, the noise of which therefore largely covers the object 4 in the recorded image 28. Using the Wiener filter, it is possible to reduce the influence of noise in the frequency space during the deconvolution such that the application thereof in the case of a poor signal-to-noise ratio is advantageous. The mean spectral power density of the noise may be included in the Wiener filter or in the Wiener deconvolution, in a manner dependent on the frequency in the frequency space. In this respect, the noise may be included and back calculated in the back calculation as a third factor in addition to the point spread function and the swivel vector 30. As a result of this, the image quality of the object 4 in the search image 20 may be further improved.

Noise in the image may have a number of causes. The cause with the greatest weight will generally be the background noise, i.e. the noise of actual background radiation in the surroundings of the object 4. In FIG. 1, this background noise 36 is depicted symbolically. In a first scan of the search space 24, the background noise is ascertained, from the recorded images 28, in a spatially dependent manner by a sequence of recorded images 28, over the area of a plurality of search images 20 in the shown exemplary embodiment from FIG. 1, wherein covering of the search images 20 was dispensed with in FIG. 1 for reasons of clarity and only a sequence of three search images 20 is depicted as ascertainment space for the spatially dependent background noise. An ascertainment space of m×n search images 20 or recorded images 28, 3×4 images 20, 28 in the shown case, would likewise be possible. In a subsequent scan of the same ascertainment region, this background noise 36 may be taken into account as a parameter during the back calculation, for example by means of a Wiener deconvolution, such that an object 4 possibly present comes to light more visibly there.

A further non-negligible variable in the noise is represented by the detector noise 38 of the detector 10. The detector noise 38 may also be ascertained in preceding images and used as a parameter in the back calculation, and so the interference factor by the detector noise 38 during the back calculation of the recorded images 28 into the search images 20 is reduced. Since the readout electronics 12 may also cause readout noise 40, it is advantageous also to use the readout noise 40 as a parameter in the back calculation. The same may also apply to interference by way of optics noise 42 caused by the optics unit 8, and so taking this into account in the back calculation is also advantageous.

In a possible application of the invention, the apparatus 2 is part of a seeker head of a missile 44. The seeker head comprises the optics unit 8 which is swivellable relative to an external skin of the missile 44 and by means of which the search space 24 may be scanned image-by-image prior to a launch of the missile 44. If the object 4 is identified in the search space 24, it is possible to mark said object, or the position thereof, in the search space 24, in a search image 20 and/or in an image wallpaper and therefore acquire said object as a target. The missile 44 may subsequently be launched and it flies independently towards the target or the object 4.

The following is a summary list of reference numerals and the corresponding structure used in the above description of the invention:

2 Apparatus
4 Object
6 Camera
8 Optics unit
10 Detector
12 Readout electronics
14 Image processing unit
16 Drive
18 Swivel capture unit
20 Search image
22 Field of view
24 Search space
26 Swivelling direction
28 Recorded image
30 Swivel vector
32 Point image
34 Point spread
36 Background noise
38 Detector noise
40 Readout noise
42 Optics noise
44 Missile
$t_i$ Time
$\Delta x_i$ Distance
$T_I$ Integration time
$T_T$ Dead time
X Image length

The invention claimed is:

1. A method for identifying an object in a search image, the method comprising:

recording the object and surroundings around the object with an optics unit of a camera to generate a recorded image;
swivelling the optics unit in the surroundings during an integration of a recorded image; and
back calculating, with an image processing unit, the search image from the recorded image using a point spread function and a swivelling movement of the optics unit; and
searching the search image for the object to identify the object in the search image.

2. The method according to claim 1, wherein the back calculating step comprises using a convolution kernel of the point spread function and of a point blurring by the swivelling movement, and calculating the search image by inverse convolution with the convolution kernel.

3. The method according to claim 1, which comprises completely covering a search space by a sequence of recorded images that are recorded during continuous swivelling of the optics unit.

4. The method according to claim 1, which comprises defining a swivelling movement during the integration of the recorded image over at least 10% and at most 50% of an image diameter in the swivelling direction.

5. The method according to claim 1, which comprises using a Wiener filter in the back calculating step.

6. The method according to claim 1, which comprises using noise in a frequency space caused by the optics unit as a parameter in the back calculating step.

7. The method according to claim 1, which comprises using readout noise caused by readout electronics of the camera as a parameter in the back calculating step.

8. The method according to claim 1, which comprises using detector noise in the camera as a parameter in the back calculating step.

9. The method according to claim 1, which comprises using background noise of the surroundings ascertained from an earlier image recording as a parameter in the back calculating step.

10. The method according to claim 9, which comprises ascertaining the background noise with spatial dependency by way of a sequence of recorded images.

11. An apparatus for identifying an object in a search image, the apparatus comprising:

a camera with an optics unit, a detector, and a drive for swivelling said optics unit in the surroundings;
a swivel capture unit configured for capturing a swivelling of said optics unit;
an image processing unit configured to control image recording during driven swivelling of said optics unit and to capture the swivelling by way of the swivel capture unit during the image recording, said image processing unit being configured to back calculate a search image from the recorded image using a point spread function and the captured swivelling movement of said optics unit and to search the search image for the object.

* * * * *